June 21, 1949.　　　L. E. LA BRiE　　　2,473,803
MASTER CYLINDER
Filed June 1, 1945　　　2 Sheets—Sheet 1
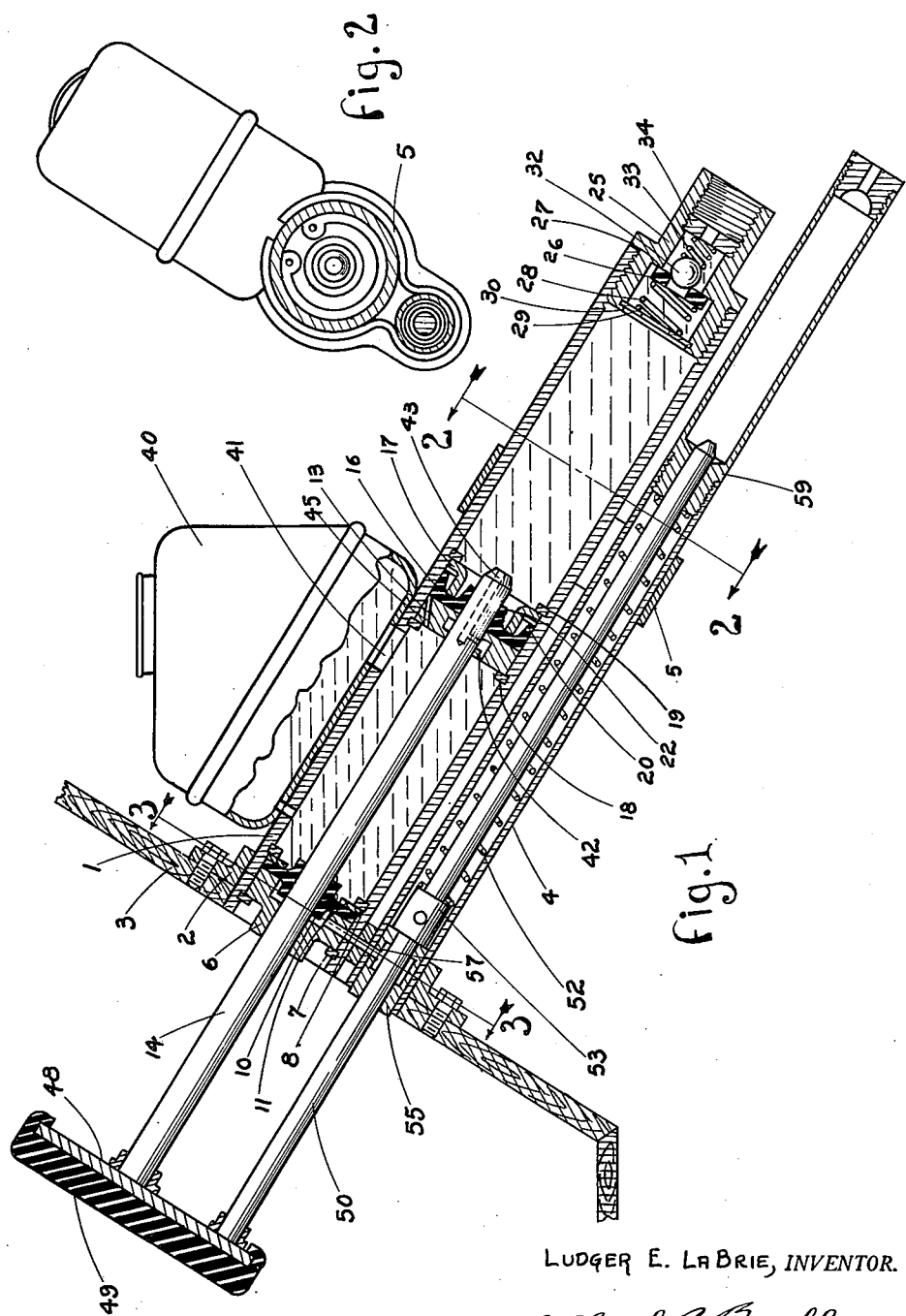
LUDGER E. LaBRIE, INVENTOR.
BY *Clifford C. Bradbury*
ATTORNEY June 21, 1949.  L. E. LA BRIE  2,473,803
MASTER CYLINDER
Filed June 1, 1945  2 Sheets-Sheet 2
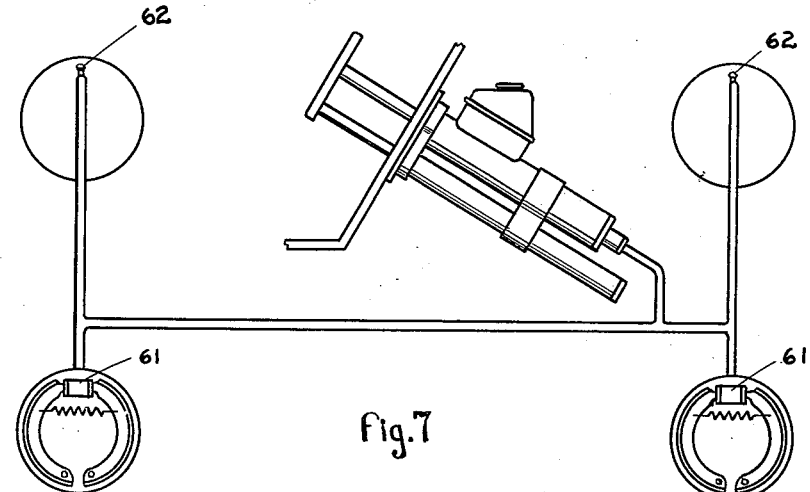
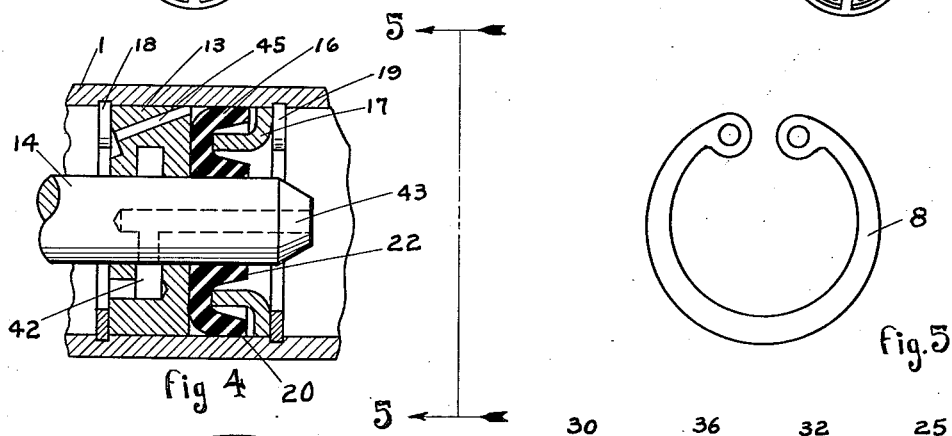
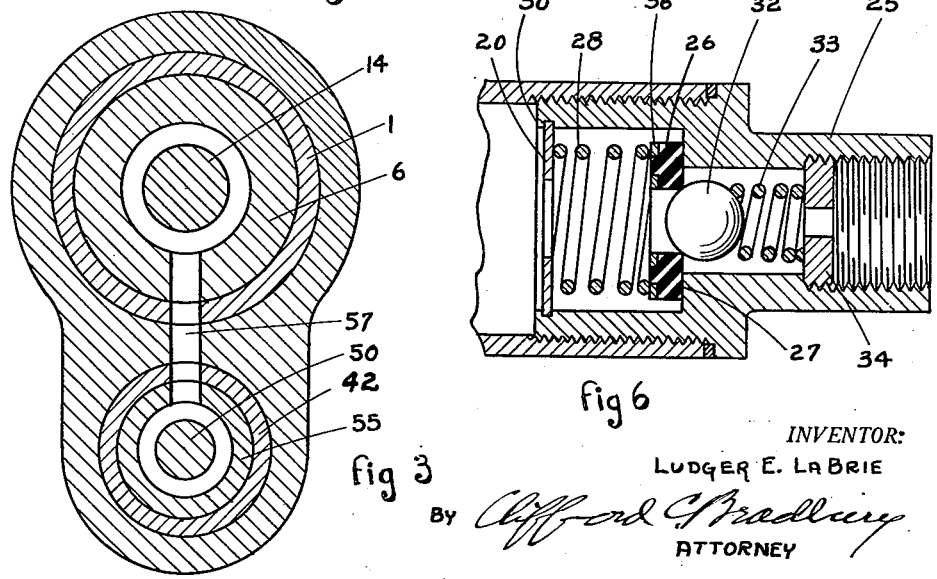
*INVENTOR:*
LUDGER E. LA BRIE
BY Clifford C. Bradbury
ATTORNEY Patented June 21, 1949

2,473,803

UNITED STATES PATENT OFFICE 2,473,803

MASTER CYLINDER

Ludger E. La Brie, Detroit, Mich., assignor to Hydraulic Brake Company, Detroit, Mich., a corporation of California Application June 1, 1945, Serial No. 597,102

3 Claims. (Cl. 60—54.6)

This invention relates to master cylinders for hydraulic brake systems or other systems having motors to be actuated by manually developed fluid pressure.

One object of this invention is to provide a master cylinder, the piston of which is directly depressed by the automobile driver instead of its being depressed through linkages. Friction, wear and noise in the linkages are thus eliminated.

Another object of the invention is to provide a piston which slides through a stationary packing cup, the piston being in the form of a long rod. This arrangement avoids the necessity of finishing the inside of the cylinder to a high polish.

Another object of the invention is to provide a guide and spring-pressed rod mounted parallel with the cylinder and its piston to return the foot pad and piston to their normal position and prevent them from rotating.

Another object of the invention is the provision of a compact unit of such size and shape that it can be readily mounted on the lower side of the floorboard of an automobile.

Other objects of the invention will appear in the following specification and claims.

My invention is illustrated in the accompanying drawing, in which

Fig. 1 is a vertical section.

Fig. 2 is a section taken on the line 2—2 of Fig. 1.

Fig. 3 is a section taken on the line 3—3 of Fig. 1.

Fig. 4 is an enlargement in section of the piston packing and its support.

Fig. 5 is an elevation of one of the C-springs used for holding the piston packing and its support in proper position within the cylinder, and as viewed from the line 5—5 of Fig. 4.

Fig. 6 is an enlargement of the valve mechanism shown in Fig. 1, and

Fig. 7 is a schematic drawing of the master cylinder of this invention as it is attached to the brake operating cylinders at the four wheels of a motor vehicle.

Like characters are used to designate the same parts throughout the various views.

A cylinder 1 is suitably supported by flange 2 attached to the underside of the floorboard 3 of an automobile. The flange 2 likewise embraces a guide cylinder 4 which extends downwardly in parallelism with the cylinder 1. A band 5 (see Fig. 2) holds the cylinders 1 and 4 in spaced relation at a position remote from the flange 2.

A cylinder head 6 is maintained in position within the upper end of the cylinder 1 by a pair of C-springs 7 and 8 of a type illustrated in plan view in Fig. 5, there being a rubber sealing washer 10 held in place on the cylinder head 6 by a metallic ring 11. At a position within the cylinder 1, somewhat remote from the head 6, is a partition 13, which serves as a guide for a plunger 14, which extends through the central opening in the cylinder head 6 and an opening through the sealing washer 10 and throughout an aligned opening in the partition 13. A cup washer 16 abuts the underside of the partition 13 and is held in place by a flanged member 17. The partition 13, cup washer 16 and flange member 17 are held in position within the cylinder by a pair of C-springs 18 and 19, shaped as shown in Fig. 5. The cup washer 16 has two flange members facing downwardly in the cylinder 1. The flange member 20 presses against the inner wall of the cylinder 1, while the flange member 22 presses against the external cylindrical surface of the plunger 14.

The lower end of the cylinder 1 is provided with a closing member 25 which serves as the housing for a two-way valve structure comprising a rubber valve member 26 held against a shoulder 27, serving as a valve seat by a spring 28 and a ring 29, the ring being held in place by inwardly crimping the edge 30. A ball 32 is held against the rubber valve member 26 by a spring 33 of less pressure than the spring 28. A disc 34 having a hole through it for the passage of fluid is threaded into the external end of the closing member 25. The closing member 25 also provides the coupling to which is attached the tubing for conducting the brake fluid to the wheel cylinders. The closing member 25 and its associated valves are shown enlarged in Fig. 6 where a perforated metallic ring 36 is illustrated as imbedded in the rubber valve member 26 to prevent its undue distortion under the conflicting pressure of springs 28 and 33 and the brake fluid.

The space between the cylinder head 6 and the partition 13 communicates with the lower part of the reservoir 40 by way of an opening 41. The part of the cylinder 1 above the partition 13 and that below the partition 13 are in normal communication with one another through passages 42 and 43 within the partition member 13 and the lower end of the plunger 14, respectively. (See Fig. 4.) The communication between the passages 42 and 43 is interrupted after the first small downward movement of the plunger 14. As shown in Fig. 4, the partition 13 is provided with one or more openings 45 which permit a flow of fluid from the upper to the lower portions of the cylinder 1 whenever a higher pressure occurs in the fluid of the upper chamber than that in the fluid of the lower chamber of the cylinder. This passageway is useful primarily during the initial filling of the system, though a flow through this passageway may occur at other times as will be hereinafter more fully described in conection with the operation of the structure.

The upper end of the plunger 14 is provided with a pedal member 48 to which a foot pad 49 is suitably attached. The member 48 is also attached to a plunger 50 which is guided within the cylinder 4 to prevent the rotation of the foot pad. A spring 52 within the cylinder 4 abuts a sleeve 53 on the plunger 50 to return the plunger 50 and its attached plunger 14 to their normal positions. The sleeve 53 abuts a head 55 within the cylinder 4 to provide a limiting position for the plungers 50 and 14. A passageway 57 (see Fig. 3) permits a small amount of brake fluid, which passes the rubber packing 10, to enter the cylinder 4, to lubricate the plunger 50. The lower end of the cylinder 4 is provided with an abutment and plunger-guide member 59.

In Fig. 7, wheel cylinders 61 are diagrammatically illustrated at two of the four vehicle wheels. Bleeder valves 62 are diagrammatically illustrated at the other two of the vehicle wheels. It is to be understood, however, that each of the wheels is provided with a suitable brake actuating cylinder like 61, and a suitable bleeder valve like 62.

In operation, the brake system is initially charged with brake fluid by filling the reservoir 40 and the communicating upper chamber of the cylinder 1 while the bleeder valves 62 at the wheels of the motor vehicle are left open. An operator then successively depresses the foot pedal 48, causing first air and then fluid to pass the ball valve 32 at the lower end of the cylinder 1. Upon each return stroke of the plunger 14, fluid is drawn into the pressure cylinder through the passageway 45 and past the outer lip 20 of the cup washer 16. As the fluid is pumped out of the reservoir and into the system, additional fluid is added until air ceases to be expelled at the bleeder valves 62. After the bleeder valves are closed and all air has been expelled from the system, a further depression of the foot pedal 48 creates pressure in the lower chamber of the cylinder 1, throughout the tubing and within the wheel cylinders 61, causing the application of the brakes. Upon the return of the brake pedal to its normal position, the springs at the wheels cause a return of brake fluid to the lower chamber of the cylinder 1 by now lifting the rubber valve member 26 off of its abutment 27. The spring 28, however, is of sufficient strength to maintain a small pressure (about ten pounds per square inch) in the lines and wheel cylinders, the purpose of which is to prevent air from being drawn into the wheel cylinders.

When the foot pedal 48 and its associated plunger 14 have returned to their normal position, the fluid in the lower and upper chambers of the cylinder 1 is in free communication through the openings 43 and 42 in the plunger 14 and partition 13. By this arrangement, if the plunger 14 is returned to its normal position before all of the fluid has had time to return from the wheel cylinders to the lower chambers of the cylinder, the portion which returns after the plunger is in its normal position passes freely into the upper chamber of the cylinder 1 and into the reservoir 40. When the plunger 14 returns to normal position more rapidly than the fluid can return from the line, a negative pressure is created in the lower chamber of the cylinder 1 which is satisfied by a flow of fluid from the upper chamber of the cylinder through the passage 45 in the partition 13 and around the periphery of the cup washer 16, the flange 20 of which is deflected away from the wall of the cylinder to permit the passage of fluid.

Since there is no movement of a piston along the inner wall of the cylinder 1, it is unnecessary that this wall be finished to a high polish, thus saving a considerable structural expense. Ordinary commercial steel tubing has a sufficiently smooth finish for the seal of the lip 20 of the cup washer 16 under the fluid pressure created in the lower chamber of the cylinder. Commercially finished drill rod may be used for the plunger 14.

While I have shown and described my invention with respect to certain details of construction, I do not wish to be unduly limited thereto, many modifications being possible without departing from the spirit or scope of my invention.

I claim:

1. In a master pressure device for hydraulic brakes, a pair of parallel plungers, a reservoir into which one of said plungers extends a pressure chamber into which the first plunger extends for creating fluid pressure upon the inward movement of said plunger, a spring housing into which the other of said plungers extends, a packing about the first plunger to retard the escape of fluid from the reservoir along the plunger, a guide member having openings therein, one for each plunger, and having a cross-opening from outside the packing member for one plunger to the guide for the other plunger to lubricate the latter plunger by brake fluid which passes the packing member.

2. In a hydraulic master pressure device, a pair of parallel cylinders, a pair of parallel plungers one extending into each cylinder, a foot pedal carried by and rigidly attached to both said plungers, one of said plungers serving to produce fluid pressure in one of the cylinders when the foot pedal is depressed, a spring in the other cylinder surrounding the second plunger and acting thereon to return it, its associated foot pedal and the pressure plunger to normal position said second plunger being guided both above and below said spring to relieve the other plunger of some side pressure to reduce wear and consequent fluid leakage.

3. In a hydraulic master pressure device, a pair of parallel cylinders, a pair of parallel plungers one extending into each cylinder, a foot pedal carried jointly by said plungers, one of said plungers serving to produce fluid pressure in one of the cylinders when the foot pedal is depressed, a spring surrounding the second plunger and acting thereon to return it, its associated foot pedal and the pressure plunger to normal position, a removable guide for the lower end of the second plunger also acting as an abutment for said spring the second plunger and its lower guide serving to hold the first plunger in alignment, thus reducing wear on the packing and guide through which said first plunger moves to create fluid pressure.

LUDGER E. LA BRIE.

REFERENCES CITED

The following references are of record in the file of this patent:

UNITED STATES PATENTS

| Number | Name | Date |
|---|---|---|
| 1,865,561 | Furgason | July 5, 1932 |
| 1,939,788 | Olson | Dec. 19, 1933 |
| 2,009,105 | Carroll | July 23, 1935 |
| 2,102,834 | Carroll | Dec. 21, 1937 |
| 2,104,735 | Carroll | Jan. 11, 1938 |
| 2,195,244 | Ericson | Mar. 26, 1940 |
| 2,197,012 | Sauzedde | Apr. 16, 1940 |
| 2,232,350 | Swift | Feb. 18, 1941 |

FOREIGN PATENTS

| Number | Country | Date |
|---|---|---|
| 490,779 | Great Britain | Aug. 22, 1938 |
| 506,972 | Great Britain | June 7, 1939 |
| 107,546 | Austria | Oct. 10, 1927 |